Oct. 2, 1934.  E. GREENE  1,975,639
DASH TIRE PRESSURE INDICATOR
Filed Sept. 27, 1930   5 Sheets-Sheet 1

Inventor:
Edgeworth Greene,
By his Attorney

Oct. 2, 1934.  E. GREENE  1,975,639
DASH TIRE PRESSURE INDICATOR
Filed Sept. 27, 1930   5 Sheets-Sheet 2

Inventor:
Edgeworth Greene,
By his Attorney,

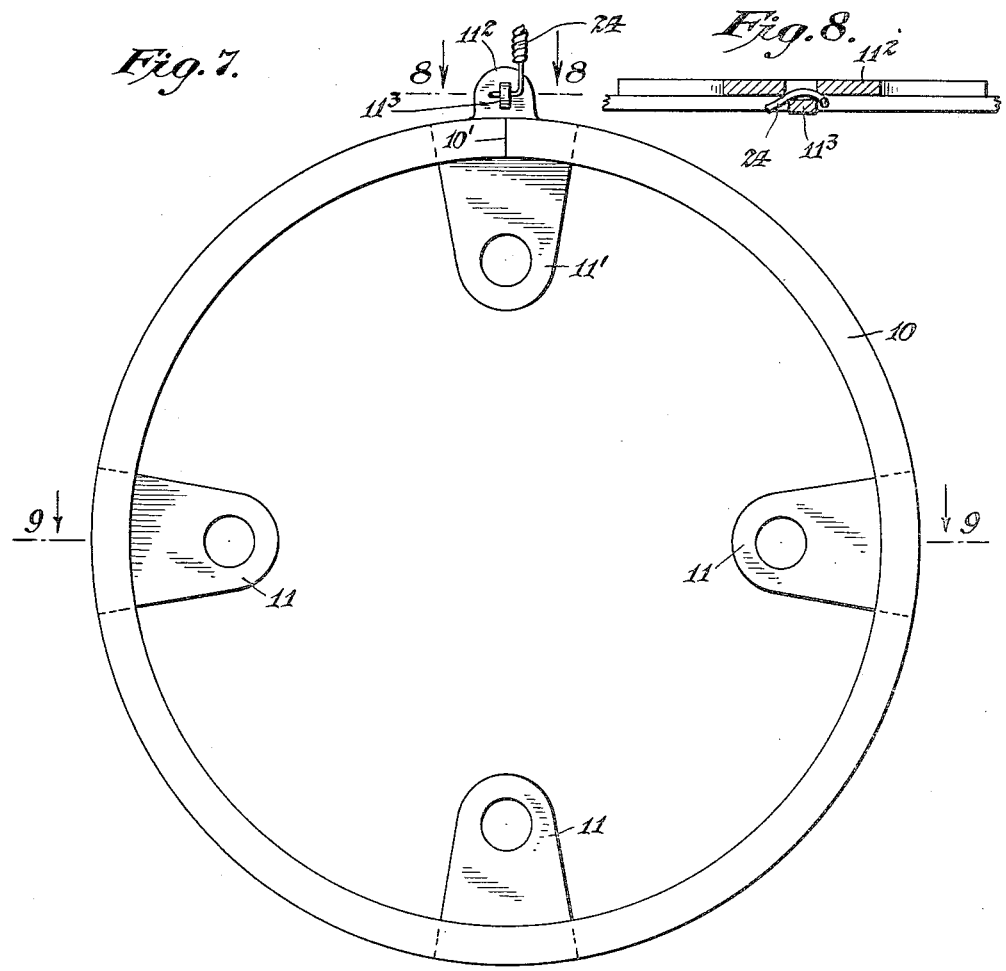
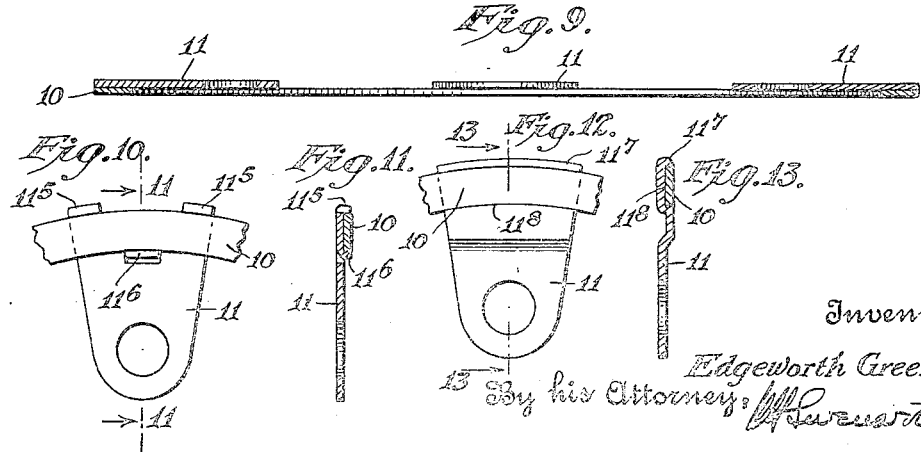

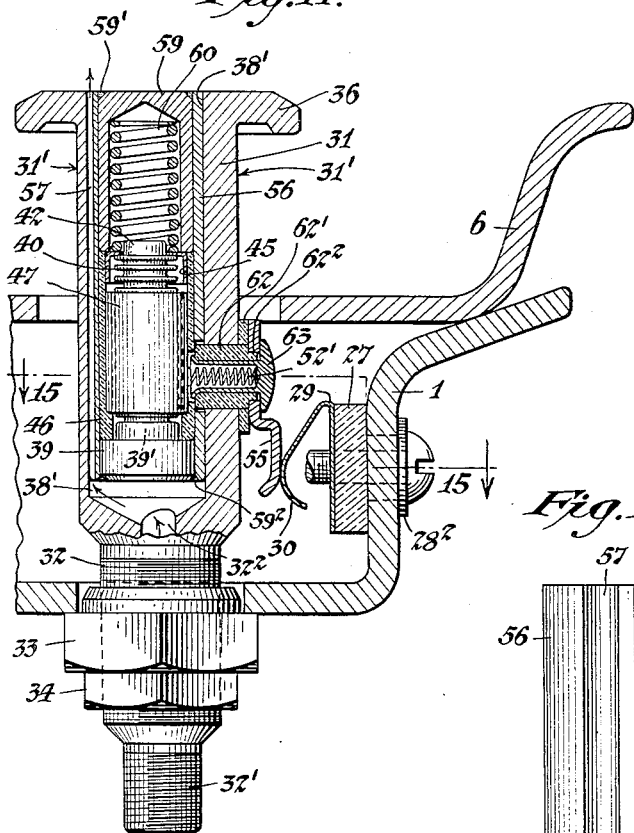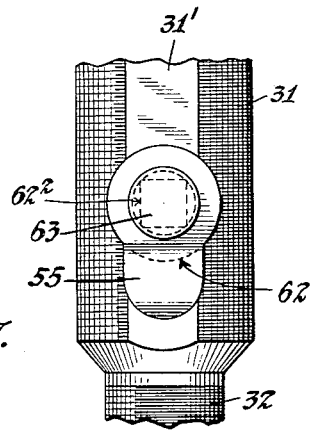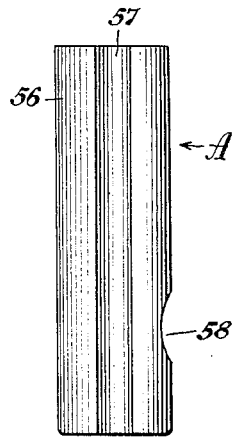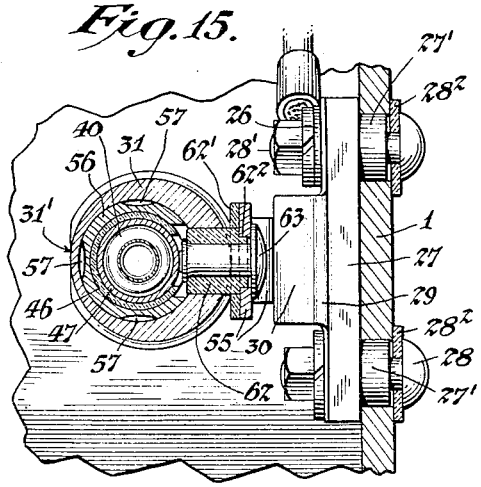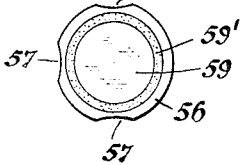

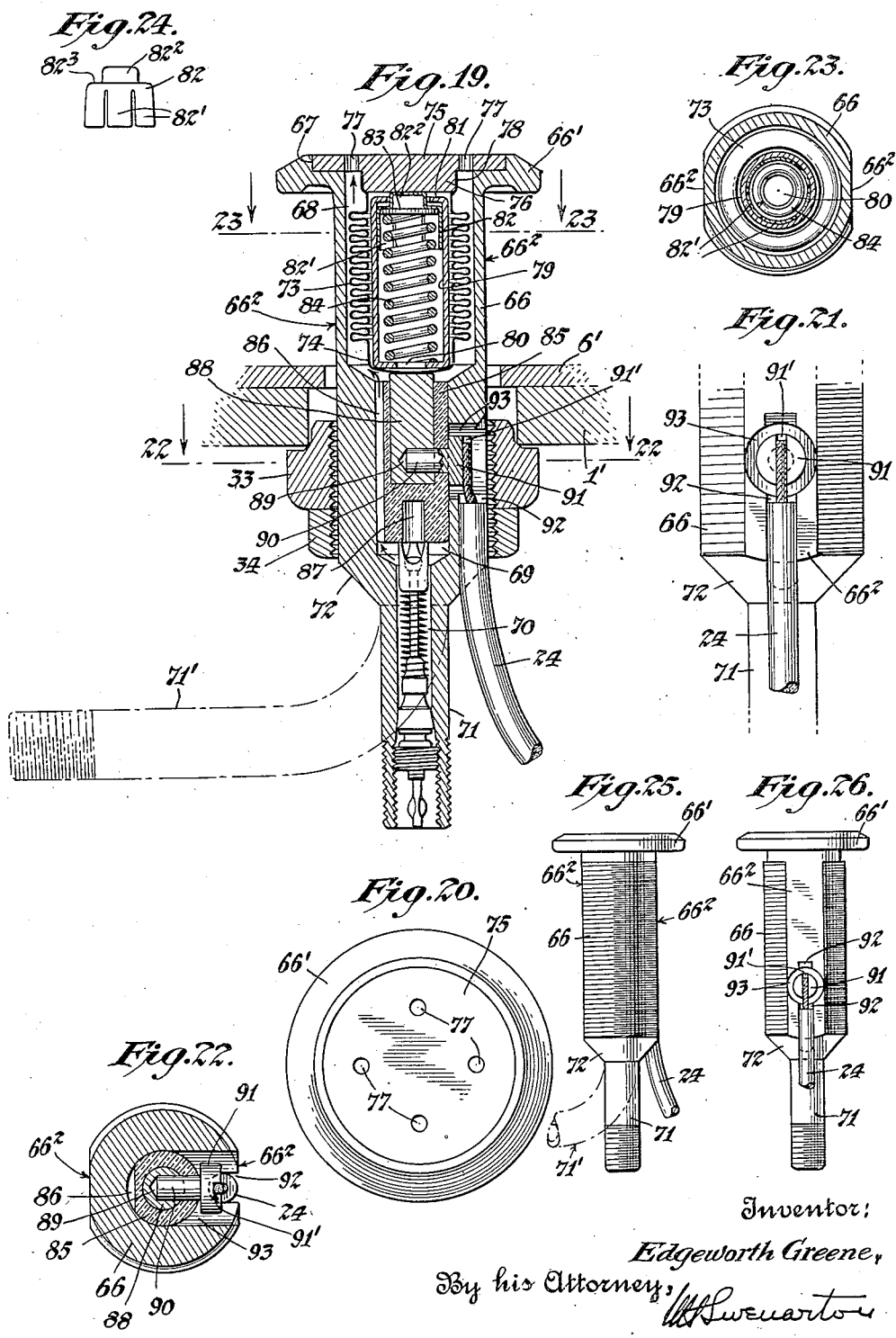

Patented Oct. 2, 1934

1,975,639

UNITED STATES PATENT OFFICE 1,975,639

DASH TIRE PRESSURE INDICATOR

Edgeworth Greene, Montclair, N. J.

Application September 27, 1930, Serial No. 484,797

15 Claims. (Cl. 200—58)

This invention relates to automatic tire-pressure indicators in which air-pressure losses in vehicle wheel tires beyond a predetermined extent, either from punctures, a slow valve leak or from inherent pressure losses, will operate one or more signals, either audible or visible, or both, preferably in this instance four red lights so that the driver of the vehicle or car may receive a definite timely warning thereof and be apprised as to which one of several tires is so affected.

Heretofore it has often been customary to equip automobiles with devices readable on the instrument panel to inform the drivers as to the temperature conditions in the radiator, the condition of the electric system or of the gas or oil supply, but up to the present time, the drivers of automobiles have been deprived of the equally important and useful advantages as hereinafter set forth which are obtainable by the provision on the instrument panel of a tire-pressure indicator or gauge. Among the reasons for the failure of the automobile manufacturers to equip their cars with such tire pressure indicators, was the apparently insurmountable difficulty presented by the problem of effectively connecting the revolving bodies of compressed air within each tire with a signal or signals in such a manner as to reliably and immediately indicate to the driver the particular condition of each tire independently of each other. My investigations have led to the discovery that this baffling problem can be completely solved by means of my improved tire pressure indicator, as set forth in detail in the following description and drawings forming a part of this specification.

While some drivers may be skilled enough through long experience to instinctively sense, in steering, a serious loss of pressure in a front tire without other specific assistance, they can rarely immediately sense such a pressure loss in the rear tires and in any event are not a fair index of the vast majority of drivers.

The main object of this invention is to safeguard human life against the possible disastrous results of a flat tire, particularly of the balloon type, when the vehicle or car is running at the modern high rates of speed, since, as above stated, if it happens to be a front wheel the car is thrown more or less out of balance and the driver may experience the greatest difficulty in keeping it on the road until it can be brought safely to a stop.

Again, a tire may pick up a nail and the driver is ignorant that a loss in pressure is taking place until such time as the tire has suddenly completely collapsed due to the final reaching of a pressure low enough to permit the creeping of the shoe on the rim with the consequent tearing of the inner tube, as a result of traction stresses and severe strains from four wheel brakes. This is particularly characteristic of balloon tires. Hence another object of the invention is to prevent such untimely and expensive destruction.

A further object to the invention is to prevent the rim cutting of shoes and other deterioration due to inadvertently operating on pressures far below those prescribed by tire manufacturers as the optimum to obtain the greatest length of life of the tire.

Further objects of the invention are hereinafter set forth.

In the annexed drawings, forming a part of this specification

Fig. 7 is an elevation of the slip ring which is adapted to be mounted within the brake drum, being secured to the spoke bolts;

Fig. 8 is an enlarged section on the line 8—8 of Fig. 7;

Fig. 9 is a transverse section on the line 9—9 of Fig. 7;

Fig. 10 is a detail plan view showing a modified form of contact ring lug;

Fig. 11 is a transverse section on the line 11—11 of Fig. 10;

Fig. 12 is a detail plan view of a still further modified form of contact ring lug;

Fig. 13 is a transverse section on the line 13—13 of Fig. 12;

Fig. 14 is a vertical section taken at right angles to the view shown in Fig. 2 of a tire stem isolated from the tire equipped with modified form of my invention;

Fig. 15 is a transverse section on the line 15—15 of Fig. 14;

Fig. 16 is a side elevation of the tire stem shown in Fig. 14 of such binding post;

Fig. 17 is an elevation of the tubular insert shown in Fig. 14;

Fig. 18 is a plan view of the tubular casing shown in Fig. 17, isolated;

Fig. 19 is a vertical section of a tire stem embodying a modification of my invention;

Fig. 20 is a plan view of the upper end of said stem showing the bellows support plate;

Fig. 21 is a fragmentary side elevation showing the modified form of binding post;

Figure 1:
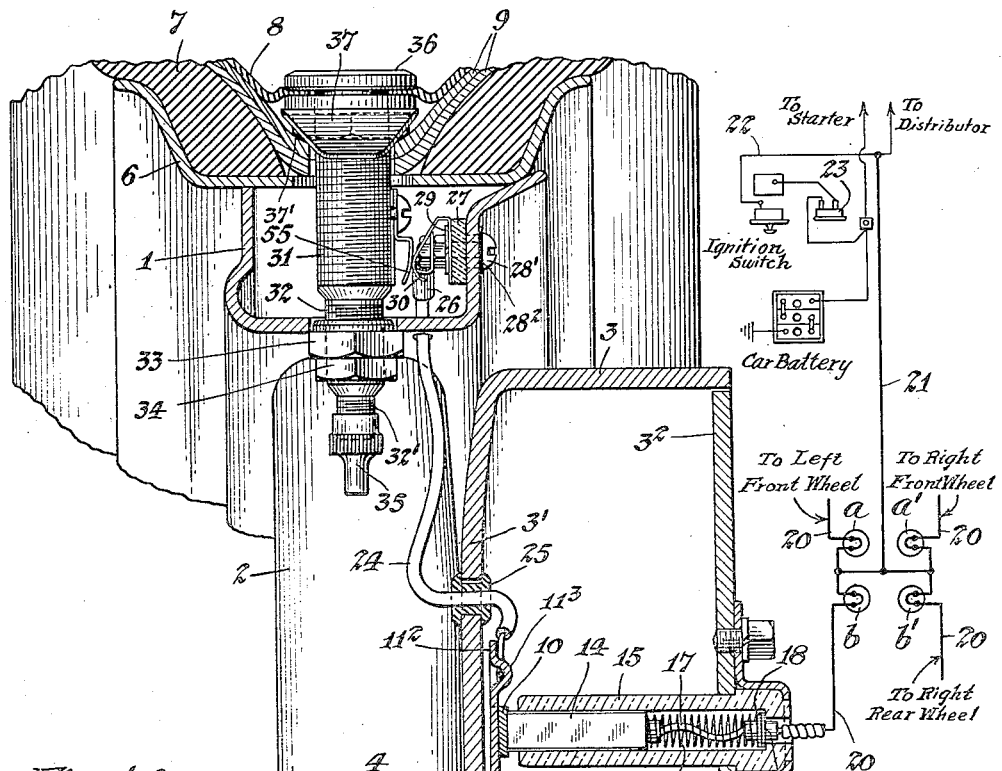
Figure 1 is a fragmentary transverse section of a wheel of an automobile equipped with my improved tire pressure indicator, the signal lights and electric circuit being shown diagrammatically.

Figs. 22 and 23 are respective cross sections on the lines 22—22 and 23—23 of Fig. 19; and Fig. 24 is an elevation of the inertia element isolated;

Fig. 25 is an elevation of the stem shown in Fig. 19, isolated; and Fig. 26 is a side elevation of the same stem.

Referring to the drawings and the construction shown therein, the reference numeral 1 designates the felloe and 2 the wooden spokes of a wheel of an automobile, the same being equipped with the usual brake drum 3. The reference numeral 3' designates the front wall of such brake drum and $3^2$ the brake support plate. Said spokes are secured at their lower ends by means of spoke bolts 4 to the hub flange 5 and on the upper end thereof are secured in the well known manner to the felloe 1, which is adapted to receive the tire rim 6. The tire 7, which is of the pneumatic type, is provided with the usual inner tube 8 which preferably is provided with the usual tire liner 9. A contact ring 10 which is welded or soldered, as indicated by the reference numeral 10' is secured to lugs 11 carried by the inner ends of said spoke bolts whereby said lugs project across, but out of contact with the inner face of the front wall of the brake drum 3'. A special lug 11', having a projecting tab $11^2$, which is struck up therefrom and is formed into a loop $11^3$, serves to connect an insulated conductor forming part of the special electric circuit, as hereinafter described, to the special lug 11' carried by said ring. In the construction shown in Fig. 1A, a special skeleton spring socket $11^4$ is riveted to the lug 11, the same being adapted to receive a ball terminal element, hereinafter described, carried by the end of said insulated conductor. An insulated bushing 12, serves to space and insulate the lugs 11' from the brake drum and hub bolts 4, and an insulating washer 13 serves to maintain said lugs in position on said bushing and hub bolts and also insulates the same from said hub bolts.

Co-operating with said contact rings 10, is a brush conductor 14, the same being preferably of a graphitic nature of the well known type commonly used on commutators of electric motors and the like. Said brush is mounted in an insulated housing 15, preferably formed of a phenolic condensation product which is unaffected by moisture, such for example, of a material that is commonly termed bakelite, which housing projects through an aperture in the stationary brake support $3^2$, said housing being of enlarged cross section at its outer end so as to limit the extent to which the same can project into the brake drum proper. The coil spring 16 is adapted to envelop the reduced end of brush the same enveloping a pigtail 17 projecting from said brush and the outer end of said spring being adapted to exert pressure against the flanged terminal clip 18 carried by the said pigtail, the latter being confined against escape through the reduced bore at the outer end of said housing 15, said spring thereby serving to maintain continual elastic engagement between the inner end of the brush member and the contact ring 10. A conducting terminal 19 is engaged by said clip 18 and a wire conductor 20 is electrically connected therewith in any suitable manner, said wire serving, when the circuit through the brush is alive, to conduct the current through a particular dash lamp a, a', b or b' which corresponds to the particular tire with which such conductor is associated, in this instance being the dash lamp b. A common conductor 21 serves to connect the filaments of the dash lamps, which are grouped in the dash panel, with the ignition circuit 22 of the car at a point beyond the ignition switch, whereby when the ignition switch is open, the circuit through the conductor will be dead. Reference numeral 23 designates the ammeter, such as is commonly interposed in the circuit of a car between the battery and the ignition switch. Another conductor 24, which either has a bare wire projecting from the end thereof that is adapted to be clamped beneath lug $11^3$ (see Fig. 1) or else is equipped with a ball clip 24' that is adapted to be projected into a socket $11^4$ (see Fig. 1A) in those cases where demountable wheels are employed, projects through an insulated bushing 25 in the front wall of the brake drum and thence extend through the bottom of the felloe, as shown, wherein through the clip 26, carried by its free end, it is secured to the side wall of the felloe, in the manner hereinafter described, and an insulating block 27 is secured by means of bolts 28, 28' to the inside of said felloe, the latter bolt also serving as a binding post for the clip terminal 26 which is secured thereto. Insulated washers $28^2$ are interposed between the heads of the bolts 28, 28' and the same serve to maintain the heads of said bolts out of contact with the felloe and thereby effectively insulate the same. A contact member 29, having an offset lug 30, is secured to the bolts 28, 28' and normally rests upon the inner face of the block 27, said lug being adapted, when a tire is in position in said felloe, to engage a corresponding lug carried thereby in the manner hereinafter described.

The tire stem 31 which, as shown, has two lateral flat portions 31', is of reduced cross section at its outer end as illustrated by the reference numeral 32 and the latter is provided with a bore $32^2$ of reduced cross section. The usual bushing nut 33 and lock nut 34 serve to center and rigidly secure said stem to the bottom of said felloe. Said stem is provided with the usual terminal cap 35 (see Fig. 1), and upper end of said valve stem is provided with an enlarged integral head 36 which serves in conjunction with the inner tube clamp 37 of the well known construction and nut 37', to effectively secure said stem to the inner tube of a tire. Said stem is drilled to form a bore 38 for the reception of the bellows mechanism and associated parts hereinafter described (see Fig. 2) and in those cases where the bellows member is inserted into the capsule prior to the introduction into the stem (see Fig. 14), such bore is of greater diameter than in the construction shown in Fig. 2 where the stem is drilled to afford a by-pass. A plug member 39, which is driven with a press-fit into the bottom of the bore 38, is provided with a boss of reduced cross section 39', and soldered into the end of a metal bellows 40 of the expansive type, commonly termed a sylphon bellows. Said plug 39 is provided with a drill hole 41 which affords communication between the space beyond the outer end of the plug 39 and the interior of said bellows, since the latter is closed at its inner end 42. A hollow retaining plug 43 which at its outer end has a press-fit in the bore 38 of the tire stem, serves to receive and retain a coil spring 44 which normally operates to cause the contraction of said bellows as hereinafter explained. A cup-shaped inertia or friction element 45 is interposed between the said spring and the outermost convolution of the bellows and as shown (Fig. 4) said friction element is cut away to form spring fingers 45' which normally bear against a fibre or other insulating sleeve 46 that is inserted into the said bore 38. The bore of the said sleeve 46 is of somewhat reduced cross section adjacent its lower end in order to adapt the same to receive a stationary metal contact tube 47. The stem 31 is drilled, as indicated by the reference numeral 48, to form a by-pass which intersects a drilled opening 49 that extends at right angles thereto and thereby affords permanent communication between the interior of an inner tube and the bore 41 of the plug 39, which latter, as above stated, is in permanent communication with the interior of the bellows 40. The opposite end of the drilled passage 49 is closed by means of a plug 50. The side wall of said stem 31, adjacent the flat portion 31', is drilled to receive the insulated fibre or the like binding post bushing 51 that is secured by a press-fit therein and a hollow binding post 52 is threaded into said bushing, said binding post being insulated by means of a fibre or other insulating shield 53 from said stem. The latter is provided with a metal stud 54, which projects into an aperture in the side wall of said stem 31, which serves as a location means for positioning said shield on said stem and preventing the turning thereof while the head of said stud is being screwed down to secure a contact clip 55 thereunder. The contact clip 55 is provided with ears 55' which serve to confine the insulating shield 53 and also to locate or position the clip 55 vertically when the stud 54 is in register with its associated recess in the stem 31.

In Figs. 14 to 17, I have illustrated a unitary assembly, comprising a capsule designated as A which is adapted to be assembled with its contained parts and bodily inserted after preliminarily testing and adjusting same, into the bore 38' of the stem 31. Said capsule comprises a tubular metal casing 56 which is provided with three longitudinal milled slots 57, which serve to by-pass air around the bellows, and a transverse aperture 58 for the reception of a binding post hereafter specified. A hollow plug 59 which serves as a spring well is inserted with a press fit into the casing 56 and the joint at the outer end is soldered, as indicated by the numeral 59', to insure an hermetic sealing thereof.

Figure 2:
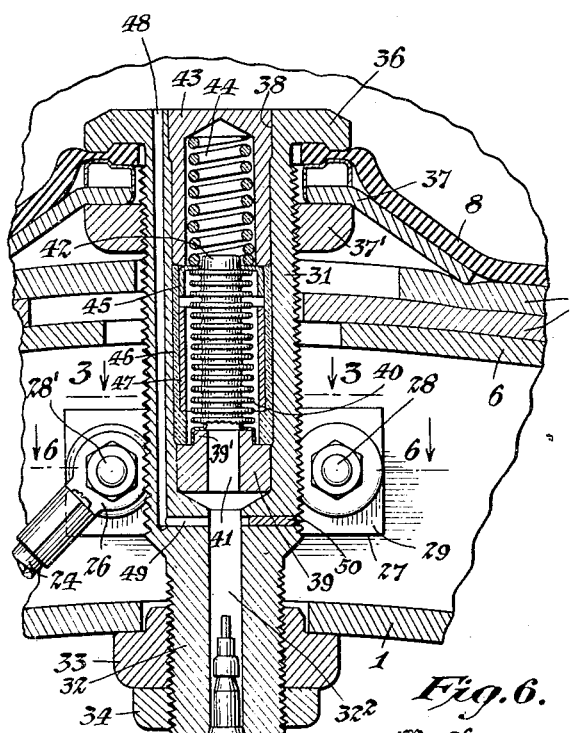
Fig. 2 is an enlarged, vertical longitudinal section of the construction shown in Fig. 1, being approximately double scale size of a portion of the construction shown in Fig. 1.

The spring 60, the bellows 40, the friction element 45, and the metal contact tube 47 are essentially the same as the spring 44 and the other correspondingly numbered elements shown in Fig. 2. A binding post bushing 62 which is formed of bakelite or the like is inserted into the aperture 58 of the casing 56 and an insulating washer 62' and spring clip 55 are mounted thereon, the latter being applied to the reduced square end $62^2$ of said bushing, being secured thereon by a hollow binding post 63. The clip 55 is in permanent communication with the clip 30 and the spring 52' which latter engages the metal contact tube 47 and the operation of the circuit closing mechanism is essentially the same as the construction shown in Fig. 2.

In the construction shown in Figs. 19 to 26, which because of its compactness and adaptability to wheels of all types is preferred, the tire stem 66 is secured to the inner tube of a tire which is mounted in the rim 6', as explained ante with respect to the stem shown in Fig. 2, and said stem is then secured to the felloe 1' by means of the bushing nut 33 and lock nut 34. Said tire stem is provided with a flanged head 66' and is flattened in the usual manner on opposite sides, as indicated by the numeral $66^2$, for the reception of a wrench when securing the stem to the inner tube, said head having a recess 67 for the reception of a bellows support-disc hereinafter described. The stem is provided with a central bore 68 and registering counter bores 69 and 70, and as shown the stem is of reduced cross section at its outer end for the reception of the usual terminal valve cap. As shown in the dot and dash lines, the lower end of the stem may constitute an angle stem 71' such as is now commonly employed in wire spoke wheels. The tapered portion 72 of said stem serves to guide the same when inserted into the felloe. The bellows 73 which is employed in this construction is closed at its lower end, as is usual in forming these bellows hydraulically, and is supported at its upper end by a disc 75 having a boss 76. The disc 75 is drilled to provide holes 77 to admit air at the pressure prevailing inside the inner tube, to chamber or counter bore 68 in which the bellows is mounted. As shown the upper end of the bellows is extended to form a tube for the reception of the boss 76 to which it is hermetically sealed by solder. A tubular open-ended spring well 79, having a bottom opening 80 and an upper terminal flange 81, is positioned within the bellows prior to sealing the same. A metal inertia or friction element 82, comprises a cap having depending integral outwardly inclined spring fingers 82', which normally project at their lower ends beyond the normal periphery of the bottom of said element 82, and a reduced upper end $82^2$ which provides a shoulder $82^3$ that affords a seat for the reception of a washer 83. A spring 84 is interposed between said washer 83 and the lower end of the casing 79 and serves to normally hold the bellows in an expanded position.

The bellows, the spring and spring well 79 are assembled together as follows: The spring and friction element 82 are first inserted into the spring well prior to upsetting the ends to form the flange 81 and then a mandrel is inserted through the hole 80 until it bears against the washer 83 and affords the requisite internal longitudinal dimension indicated by the distance between the bottom of the top flange and the bottom of the well and the flange 81 is then formed by a spinning operation. Thereupon the spring well is inserted into the bellows and the bellows is hermetically united to the boss 76 of the disc 75, thereby forming a unit for insertion into the bore 68. A stationary contact plug 85 which is flattened on one side to form a by-pass, as indicated by the reference numeral 86, is secured by a press fit into the counter bore 69 in such a manner that air can only pass through the by-pass between the flattened side of the plug and the adjacent wall of the counter bore 69. The outer end of the plug 85 is provided with a molded cylindrical recess 87 which receives the inner end of the stem of the valve train when the same is depressed. A stationary contact pin 88 is molded into the upper portion of the bakelite plug 85 and the upper end of this contact is normally out of contact with the lower end of the bellows 73 when the tube is properly inflated above predetermined minimum pressure. A drilled hole 89 in the side of the lower portion of the pin 88 serves to receive a binding post 90 which is secured thereon preferably by a press fit. The post 90 has a circular head 91 in which a slot 91' is formed that is adapted to receive the bare end of the conductor 24, the same being preferably soldered therein. In order to afford a subsurface conduit for the reception of the insulated conductor 24, a milled slot 92 is formed in the flat side $66^2$ of the stem 66, the same extending through the oblique shoulder 72 thereby avoiding the interference with the application of the nuts 33 and 34 to the stem. A circular aperture 93 is provided in the flat side $66^2$ of the stem to receive the head 91 of the binding post 90.

Referring to Figs. 10 and 11 wherein modified forms of lugs are shown for securing the slip ring or contact ring 10 to the spoke bolts, the reference numerals $11^5$ and $11^6$ designate integral ears which are struck up from the lug 11 and which are adapted to securely clinch the ring 10 therebetween.

In Figs. 12 and 13 the outer end of the lug 11 is provided with a flange $11^7$ and a groove $11^8$ for the reception of the ring 10 is formed by offsetting the lug 11 in the manner shown, whereby when said flange is clinched against said ring the same will be securely held in said groove $11^8$. The usual Schrader or like valve train is mounted as shown in the long or short types of stems herein described, the same functioning in the usual manner when inflating the tire.

Figure 1A:
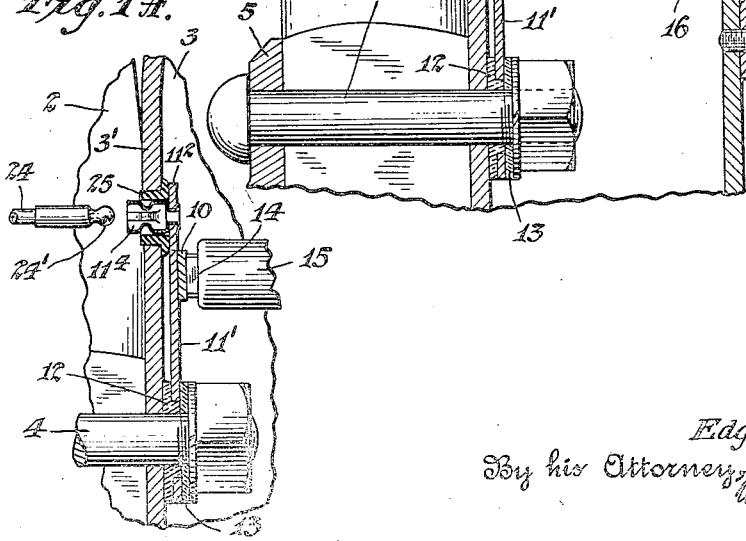
Fig. 1A is a fragmentary, vertical section of the brake drum showing a removable plug to ring in said drum.

Referring to the operation of the device more especially illustrated in Figs. 1 and 2, in which the interior of the bellows is in permanent communication with the air pressure in the inner tube, it will be apparent that when such pressure approaches the predetermined minimum, the expanded bellows aided by the spring 44 will commence to contract, but owing to the frictional engagement of the resistance or inertia element 45, the latter will be prevented from seating on the contact tube 47 until the air pressure in the bellows corresponds to the spring pressure minus the added resistance offered by the inertia element 45, and consequently once the contact is made between the latter element and its seat on the contact tube 47, the full spring pressure will come into play and being substantially greater than the air pressure in the bellows the teetering or vibration of the element 45 with respect to its seat on the end of the contact tube 47 will be prevented with the consequent elimination of arcing between the contacts. Since bellows 40 and inertia element 45 carried thereby are electrically in communication with the grounded frame of the automobile, through the disc 75, stem 66, nut 33 and felloe 1, wire spokes, hub and axle (or when wooden spokes are employed through a special insulated conductor let in to the wooden spoke which serves to connect the metal felloe with the hub) the circuit through the dash signal lamp corresponding to the particular tire which has become deflated, in this particular instance the lamp $b$, will be closed when the tire pressure falls below the predetermined minimum and the contact element 45 engages the contact tube 47, provided only that the ignition switch is closed, since said contact tube 47 is in permanent communication with said signal light $b$ through binding post 52, clips 55 and 30, conductor 24, lug 11', brush 14 and conductor 20. As a consequence, a steady illumination of the lamp $b$, as distinguished from a flickering light, will result and the driver will receive a positive warning that deflation beyond the predetermined minimum has occurred.

Upon reinflation of the tire, the contact members 45 and 47 will not separate until the air pressure in the bellows 40 exceeds the spring pressure plus the pressure or resistance offered by the friction element and consequently when the signal lamp $b$ is extinguished the pressure in the inner tube will be substantially in excess of the predetermined minimum pressure at which the circuit through the lamp $b$ was closed. Accordingly, by suitably proportioning the pressure exerted by the inertia element 45 and the strength of the spring 44 it is possible to utilize the instrument or device both as a deflation indicator as well as a tire inflation indicator; for example, the instrument can be readily designed and adjusted to close the circuit through the lamp $b$ at, say a minimum tire pressure of 30 lbs. per square inch and, on inflation to open the circuit at a pressure of 35 lbs. per square inch.

The operation of the form of device shown in Fig. 14 is similar to that shown in Figs. 1 and 2.

Figure 4:
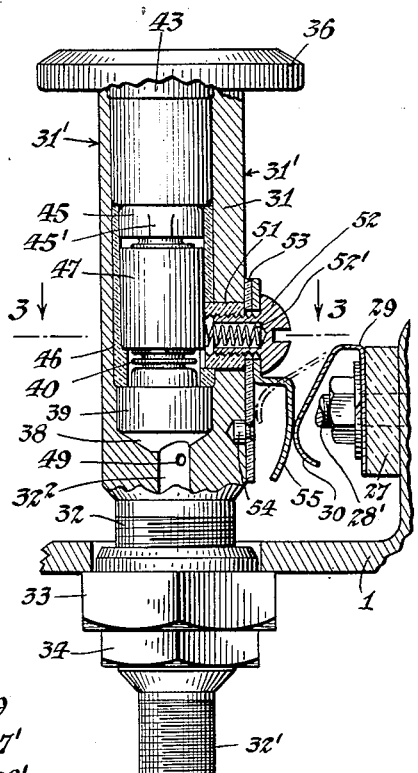
Fig. 4 is a vertical section of a tire stem shown in Fig. 2 isolated from the tire, the same being viewed in the direction indicated by the line 4—4 of Fig. 3.
Figure 6:
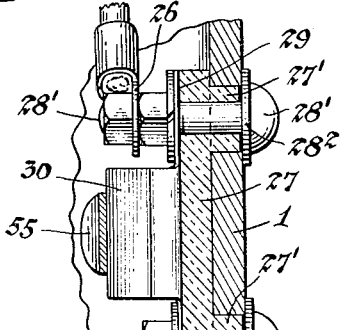
Fig. 6 is a fragmentary cross-section on the line 6—6 of Fig. 2.
Figure 3:
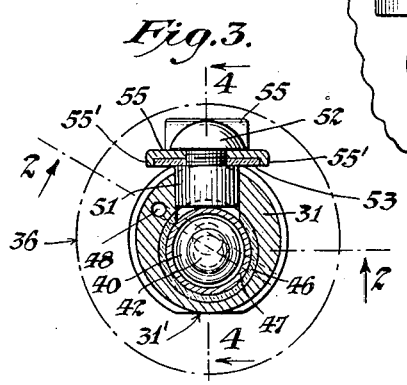
Fig. 3 is a cross-section on the line 3—3 of Fig. 2.
Figure 5:
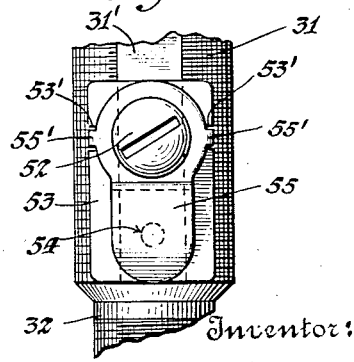
Fig. 5 is a fragmentary side elevation of a portion of the stem shown in Fig. 4 illustrating the binding post connection.

The device illustrated in Figs. 19 to 26 also operates essentially the same as that described with respect to the device shown in Figs. 1, 2 and 4 except that since the bellows 73 is hermetically sealed, preferably containing air under atmospheric pressure, its movement is directly responsive to the external pressure existing in the chamber or counter bore 68 which latter is in direct communication through the aperture 77 with the interior of the inner tube. Normally, when the air pressure in the inner tube exceeds the predetermined minimum, the external pressure on the bellows exerted by the air in the chamber 68 will cause a contraction of the bellows 73 and the lower contact end of the bellows will be out of contact with the cooperating contact pin 88, and consequently the circuit therethrough and through the corresponding signal lamp on the dash will be broken. When the air pressure in the chamber 68 falls to the predetermined minimum required to overcome the pressure of the spring 84, less the pressure corresponding to the resistance offered by the inertia element 82, the bellows will expand and the lower contact end thereof will engage the cooperating contact 88, thereby closing the circuit through the dash lamp connected to the conductor 24. As shown, when the circuit is so closed due to the expanded condition of the bellows, only the upper end $82^2$ of the friction cap 82 will engage the inner face of the disc 75, which supports the bellows 73, and the flange 81 will be in a position intermediate the lower face of said disc 75 and the shoulder $82^3$ on said friction cap, having a clearance of about 1/64''. Upon the contraction of the bellows however, the flange 81 on the spring well 79 will move toward the inner face of the disc 75 until the two engage each other, whereupon further or undue collapse of the bellows will be prevented. The pin 88 serves as a stop to limit the extent to which the bellows 73 can expand.

In the operation of the switch, the casing 79 moves axially with the bellows during the slight expansion or contraction of the latter due to changes in tire pressure values. The cap however is always stationary and the fingers 82' generate friction during such bellows movement. Thus when the tire pressure drops to the minimum to which the instrument is set, the spring 84 will expand the bellows, overcoming the incidental friction until the bellows end 74 touches the stationary contact pin 88. The object of the friction is to maintain such contact as opposed to centrifugal force in the revolving wheel, or road shocks which would otherwise momentarily break the circuit again, cause undesirable arcing, and give a variable and indefinite signal depending upon the speed of the car or the extent of such road shocks.

During the slow expansion of the bellows as the tire pressure drops, the friction is a part of the resistance to be overcome by the spring, but the moment that contact is made this added friction resistance ceases to function as such whereupon the spring will press the bellows end against the pin 88 with a pressure beyond the air pressure resistance of the tire to an extent equal to such former frictional resistance, and which latter is sufficient to neutralize the forces referred to above.

The relative areas may be calculated so the few ounces of friction will be equal to five pounds pressure in the tire. Therefore if the instrument lights the signal for a particular wheel whose pressure has dropped to thirty pounds, for example, an additional five pounds pressure has to be added to the tire pressure when reinflated in order to reopen the switch. Hence if the ignition switch is kept closed during such reinflation, the signal light will be extinguished when a pressure of thirty five pounds is again reached and so indicate the attainment of such optimum pressure.

When the bellows assembly is inserted in the tire stem the end 74 of the bellows will contact with the pin 88 in the plug and slightly contract, compressing the spring and moving the upper flange 81 of the tubular casing 79 away from the shoulder 82³ on the friction cap (about 1/64″). This clearance is provided to insure that there may always be contact, when required, with the plug pin.

When the tire is inflated and upon full inflation thereof, the bellows will contract slightly further against the resistance of the spring, the extent of such contraction being limited by the engagement of said casing flange 81 with the bottom surface of the boss 76 on the top plate 75 to which the bellows is soldered. This movement of about 1/64″ will cause the lower end of the bellows to move away from the pin in the plug member and break the circuit through the signal lamps.

The bellows contracts under maximum tire pressure because it contains only air at atmospheric pressure and is airtight, enclosing the captive spring and friction element. It will be noted that the friction cap is always held firmly against the boss of the plate by the spring, the friction generated by the movement of the casing being always inferior to the counter-force exerted by the spring.

The plug consists of a bakelite member 85 with the pin 88 moulded therein. It has a press fit in the reduced bore 69 of the stem, and with the exception of the by-pass 86 for inflation, forms an airtight seal to prevent any leakage of air about the opening for the wire connection 90. At its bottom it forms an abutment for the usual Schrader valve train and has a hole 87 to admit the valve stem of such train when the latter is depressed.

The undue expansion of the bellows shown in Figs. 1, 2 and 14 is prevented by the engagement of the upper end of the friction element 45 with the lower end of the plug 43 or 59, whereas the undue contraction thereof is prevented by the seating of the lower end of the element 45 on the upper end of the contact tube 47. Preferably the total axial movement of the bellows should not exceed about $\frac{1}{16}''$ to $\frac{3}{32}''$ as otherwise the life thereof is materially shortened.

As shown in Fig. 19, the bushing nut 33 is preferably provided with an oblique shoulder $x$ whereby when said nut is threaded on stem 66 it ruptures, when turned down forcibly with a wrench, any film of paint or other finish of poor electrical conductivity either on the adjacent corner $y$ of the felloe 1' or on the said oblique shoulder, be ruptured, thereby insuring metal to metal contact of said nut 33 and the felloe 1'.

The construction shown in Fig. 19 permits of the employment of a relatively large bellows without necessitating the employment of an excessively large valve stem because no drilling of the stem wall to by-pass the bellows is required. Since large valve stems require larger openings in the felloe than are now commonly accepted as standard and excessively large openings would seriously weaken the felloes, this construction illustrated in Fig. 19, which employs a sealed bellows, is especially adapted to standard production, thus materially reducing the expense entailed in the equipment of cars with this instrument.

The so-called resistance or inertia element serves to temporarily arrest the movement of the contact carried by the bellows towards the co-operating opposing contact until sufficient pressure is built up in the spring which is within the bellows to overcome the inertia of rest of the friction element, the spring fingers of which engage the insulated wall 46, whereupon when such potential energy has been stored up, the contact member on the bellows will suddenly move towards and engage the opposing contact members.

Various modifications of the construction herein disclosed within the scope of the appended claims may be made without departing from the spirit of my invention.

What I claim and desire to obtain by United States Letters Patent is:

1. In a tire-pressure controlled switch, the combination comprising a pneumatic tire having an inner tube, the latter being provided with a valve stem, a metallic bellows associated with said valve stem, one end of said bellows being movable in response to a change of pressure within the tire beyond predetermined limits, elastic means for expanding said bellows when the pressure within the tire falls below predetermined limits, a contact member associated with said bellows, an opposing contact carried by an independent support, means for connecting said contact to a source of electrical current, and means for increasing the normal inertia of rest of said bellows contact member to temporarily arrest the movement of the same toward the opposing contact while deflation is occurring in order to store up sufficient potential energy to cause the sudden engagement of the contact associated with the bellows and the opposing contact and to effectively prevent separation of said contacts under road shocks the instant the bellows reaches the limit of its expansive movement.

2. The sub-combination comprising a vehicle wheel having a pneumatic tire mounted thereon, a metallic bellows sealed to provide an air tight chamber associated with said wheel, one end of said bellows being movable in response to a change of pressure within the tire beyond predetermined limits, elastic means for expanding said bellows when the pressure within the tire falls below predetermined limits, a contact member associated with said bellows, an opposing contact carried by an independent support, means for connecting said contact to a source of electrical current, means for limiting the contractile movement of said bellows, and means for increasing the normal inertia of rest of said bellows contact member to effectively prevent separation of said contacts under road shocks the instant the bellows reaches the limit of its expansive movement.

3. In a tire-pressure-controlled switch, the combination comprising a tire stem, a bellows mounted to extend within said stem and having one end free to move in response to variations of air pressure within said stem, said free end constituting a movable contact, elastic means for effecting a change in the length of said bellows in opposition to said air pressure when the latter falls below a predetermined optimum, a second co-operating contact adapted to be engaged by said movable contact, a valve train, and a by-pass for air affording communication between the inside of the tire and the valve in the valve train.

4. In a tire-pressure-controlled switch, the combination comprising a tire stem, a bellows mounted to extend within said stem and having one end free to move in response to variations of air pressure within said stem, said free end constituting a movable contact, elastic means for effecting a change in the length of said bellows in opposition to said air pressure when the latter falls below a predetermined optimum, a second co-operating contact adapted to be engaged by said movable contact, a valve train, and a by-pass for air affording communication between the inside of the tire and the valve in the valve train and an electric conductor connected to said fixed contact having a sub-surface mounting in the body of said stem.

5. In a tire-pressure-controlled switch, the combination comprising a tire stem, including a valve train adjacent its outer end, a bellows mounted to extend within said stem and having one end free to move in response to variations of air pressure within said stem and constituting a part of an electric switch responsive to said bellows movement and means affording permanent communication between the air in the tire to which said stem is attached and the valve of the valve train.

6. In a tire-pressure-controlled switch, the combination comprising a tire stem, a metallic bellows sealed to form an air-tight element and mounted to extend within said stem with one of its ends free to move in response to variations of air pressure within said stem and electric contacts, one of which is associated with said bellows and movable therewith, adapted to make and break contact with each other in response to said bellows movement.

7. In a tire-pressure-controlled switch, the combination of a valve stem having associated therewith a metallic bellows mounted wholly within said valve stem and electric contact elements, one of which is associated with and movable in response to the bellows movement.

8. In a tire-pressure-controlled switch, the combination comprising a valve stem, a flexing element having an expansible wall directly responsive to the tire pressure within said stem and associated therewith, a pair of electric contacts adapted to be opened and closed by the movement of said flexing element, a spring element associated with said flexing element and normally exerting pressure thereon and a friction inertia element associated with said spring element for resisting the influence thereof.

9. In a tire-pressure-controlled switch, the combination comprising an element having an elastic expansible wall responsive to the tire pressure within a tire with which such indicator is associated, a valve stem having a valve train therein, said stem being associated with said expansible member, a by-pass conduit for tire air in permanent communication with the valve of said valve train a pair of contact members, the movement of one of said contact members being responsive to the movement of said expansible wall; and means for over-balancing one of said contact members whereby, when said contacts are in engagement with each other, the ready separation thereof, due to road shocks, will be prevented.

10. In a tire-pressure-controlled switch, the combination comprising a tire stem, a metallic bellows associated therewith and having one end thereof responsive to variations of air pressure within said stem, said responsive end having a contact member movable therewith, elastic means for expanding said bellows in opposition to the air pressure within said stem, a second contact member adapted to be engaged by said first mentioned contact and means for over-balancing said movable contact whereby, when said contacts are in engagement, the tendency for the same to separate from jars due to road shocks will be prevented.

11. A tire valve stem for a tire-pressure-controlled switch, having a chambered end for reception of a tire valve and having a channel leading therethrough and a bore extending therein from its opposite flanged end, a pressure supported diaphragm closing the outer end of said bore, a pair of contact members in the bore normally held in spaced apart relation by said diaphragm, and spring means for forcing said contacts into engagement upon failure of pressure against said diaphragm.

12. A tire valve stem for a tire-pressure-controlled switch, having a chambered end for the reception of a tire valve and having a channel leading therethrough and a bore extending therein from its opposite flanged end, a pressure supported diaphragm closing the outer end of said bore, a pair of contact members in the bore normally held in spaced apart relation by said diaphragm, a spring for causing engagement of said contacts upon failure of pressure against said diaphragm, and means for resisting the movement of said diaphragm by said spring.

13. In a tire pressure-controlled switch, the combination of a valve stem having a sealed metallic bellows element associated therewith and having one of its ends free to move in response to variations of the external pressure on the exterior of said bellows, said free end being positioned within said stem and means for confining the longitudinal movements of such bellows in response to such variation of the external pressure therein within an extremely small range so as to permit of limited axial expansion and contraction only of said bellows and to prevent excessive contraction when said bellows is subjected to abnormal air pressure.

14. In a tire pressure-controlled switch, the combination comprising a hollow valve stem having a metal bellows associated therewith which is responsive to air pressure entering said stem and means for preventing the excessive and deleterious longitudinal movement of said bellows beyond an optimum permissible amount when the bellows is subjected to an abnormally high pressure during the inflation of a tire through said stem.

15. In a tire pressure-controlled switch, the combination comprising a hollow valve stem having a metal bellows associated therewith which is responsive to air pressure entering said stem and means for preventing the excessive and deleterious longitudinal movement of said bellows beyond an optimum permissible amount and not in excess of about $\frac{3}{32}$ of an inch when the bellows is subjected to an abnormally high pressure during the inflation of a tire through said stem.

EDGEWORTH GREENE.